US012052510B2

(12) United States Patent
Terada et al.

(10) Patent No.: US 12,052,510 B2
(45) Date of Patent: Jul. 30, 2024

(54) IMAGE PROCESSING DEVICE, IMAGE PROCESSING METHOD, AND IMAGE PROCESSING PROGRAM

(71) Applicant: FUJIFILM Corporation, Tokyo (JP)

(72) Inventors: Masahiro Terada, Saitama (JP); Satoru Wakabayashi, Saitama (JP); Taro Saito, Saitama (JP); Tetsuya Mizusawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 351 days.

(21) Appl. No.: 17/523,827

(22) Filed: Nov. 10, 2021

(65) Prior Publication Data

US 2022/0070370 A1 Mar. 3, 2022

Related U.S. Application Data

(63) Continuation of application No. PCT/JP2020/021429, filed on May 29, 2020.

(30) Foreign Application Priority Data

May 31, 2019 (JP) ................................. 2019-103132

(51) Int. Cl.
*H04N 23/80* (2023.01)
*H04N 5/262* (2006.01)

(52) U.S. Cl.
CPC ........... *H04N 23/80* (2023.01); *H04N 5/2628* (2013.01)

(58) Field of Classification Search
CPC .... H04N 23/80; H04N 5/2628; H04N 5/2624; H04N 5/765; H04N 5/91; G06T 1/00

(Continued)

(56) References Cited

U.S. PATENT DOCUMENTS

2006/0082660 A1 4/2006 Tsuda
2008/0107335 A1* 5/2008 Chao ...................... H04N 7/012
382/173

(Continued)

FOREIGN PATENT DOCUMENTS

JP 2004040559 2/2004
JP 2006121326 5/2006

(Continued)

OTHER PUBLICATIONS

"International Search Report (Form PCT/ISA/210) of PCT/JP2020/021429," mailed on Jul. 14, 2020, with English translation thereof, pp. 1-5.

(Continued)

*Primary Examiner* — Stephen P Coleman
(74) *Attorney, Agent, or Firm* — JCIPRNET

(57) ABSTRACT

An image processing device includes at least one processor configured to set a reference region that is a partial region in an image indicated by image data, store, in association with the image data, information regarding the reference region including a position of the set reference region in the image and image processing parameters of the reference region, set a predetermined region in the image as a display region, and in a case where the reference region and the display region are different, generate image processing parameters of the display region based on the image processing parameters of the reference region and output a processed image obtained by executing image processing on the display region based on the generated image processing parameters of the display region.

6 Claims, 15 Drawing Sheets

(58) Field of Classification Search
USPC .......................................................... 382/282
See application file for complete search history.

(56) References Cited

U.S. PATENT DOCUMENTS

| | | | | |
|---|---|---|---|---|
| 2011/0052071 | A1* | 3/2011 | Iwamoto | G06T 7/12 |
| | | | | 382/190 |
| 2017/0230613 | A1* | 8/2017 | Endo | H04N 7/183 |
| 2017/0311037 | A1* | 10/2017 | Ohmura | H04N 7/181 |

FOREIGN PATENT DOCUMENTS

| | | |
|---|---|---|
| JP | 2006311108 | 11/2006 |
| JP | 2013127819 | 6/2013 |

OTHER PUBLICATIONS

"Written Opinion of the International Searching Authority (Form PCT/ISA/237)" of PCT/JP2020/021429, mailed on Jul. 14, 2020, with English translation thereof, pp. 1-6.
Office Action of Japan Counterpart Application, with English translation thereof, issued on Feb. 8, 2022, pp. 1-5.

* cited by examiner

FIG. 12

| REGION No. | START POINT COORDINATES | | REGION SIZE | | PRIORITY | DEVELOPMENT PARAMETER | | | | | | | |
|---|---|---|---|---|---|---|---|---|---|---|---|---|---|
| | x | y | w | h | | AREA RATIO | BRIGHTNESS | COLOR DENSITY | COLOR TEMPERATURE | F-mode | ... | SHARPNESS | NOISE |
| 0 | 0 | 0 | 40000 | 30000 | 0 | 100% | 0 | 30 | 6300 | 2 | ... | -1 | -1 |
| 1 | 5040 | 18300 | 13440 | 6300 | 1 | 7.1% | -10 | 0 | 5900 | 0 | ... | -2 | -1 |
| 2 | 2400 | 21720 | 13880 | 5940 | 2 | 6.9% | -20 | 0 | 5600 | 3 | ... | -1 | 0 |
| 3 | 12800 | 21840 | 5640 | 2730 | 3 | 1.3% | -30 | 10 | 6300 | 1 | ... | 0 | 2 |
| 4 | 29400 | 24330 | 8400 | 4230 | 4 | 3.0% | 0 | 30 | 5300 | 1 | ... | -1 | 1 |
| 5 | 28640 | 15270 | 9520 | 4500 | 5 | 3.6% | 10 | 30 | 3600 | 1 | ... | 1 | 2 |
| 6 | 23480 | 2580 | 10200 | 4590 | 6 | 3.9% | 20 | -10 | 3700 | 0 | ... | 2 | 3 |
| 7 | 1560 | 6090 | 8760 | 4260 | 7 | 3.1% | 5 | -20 | 4500 | 3 | ... | 1 | 2 |
| 8 | 18680 | 13290 | 4840 | 2130 | 8 | 0.9% | 40 | -30 | 4000 | 2 | ... | -1 | 0 |

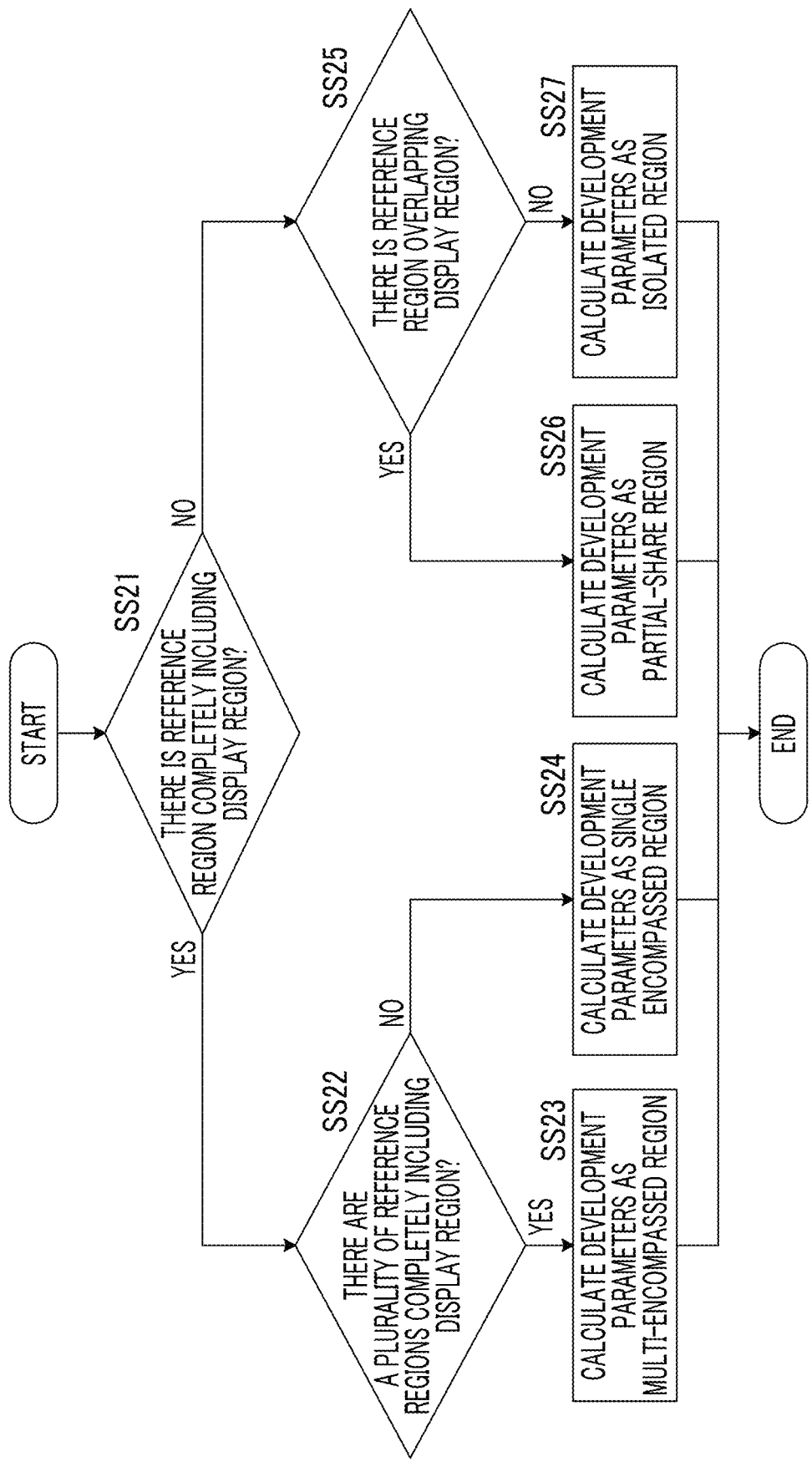

FIG. 16

| MULTI-ENCOMPASSED REGION | SINGLE ENCOMPASSED REGION | PARTIAL-SHARE REGION | ISOLATED REGION |
|---|---|---|---|
| USE DEVELOPMENT PARAMETERS OF REFERENCE REGION HAVING HIGHEST PRIORITY AMONG REFERENCE REGIONS COMPLETELY INCLUDING DISPLAY REGION | USE DEVELOPMENT PARAMETERS OF REFERENCE REGION COMPLETELY INCLUDING DISPLAY REGION | USE DEVELOPMENT PARAMETERS OF REFERENCE REGION HAVING HIGHEST PRIORITY AMONG REFERENCE REGIONS HAVING OVERLAP | USE DEVELOPMENT PARAMETERS OF WHOLE REGION |

FIG. 17

| MULTI-ENCOMPASSED REGION | SINGLE ENCOMPASSED REGION | PARTIAL-SHARE REGION | ISOLATED REGION |
|---|---|---|---|
| USE DEVELOPMENT PARAMETERS OF REFERENCE REGION HAVING SMALLEST AREA AMONG REFERENCE REGIONS COMPLETELY INCLUDING DISPLAY REGION | USE DEVELOPMENT PARAMETERS OF REFERENCE REGION COMPLETELY INCLUDING DISPLAY REGION | CALCULATE DEVELOPMENT PARAMETERS BY CALCULATION METHOD TAKING INTO CONSIDERATION AREA OF REFERENCE REGION | CALCULATE DEVELOPMENT PARAMETERS BY CALCULATION METHOD TAKING INTO CONSIDERATION DISTANCE BETWEEN REFERENCE REGION AND DISPLAY REGION |

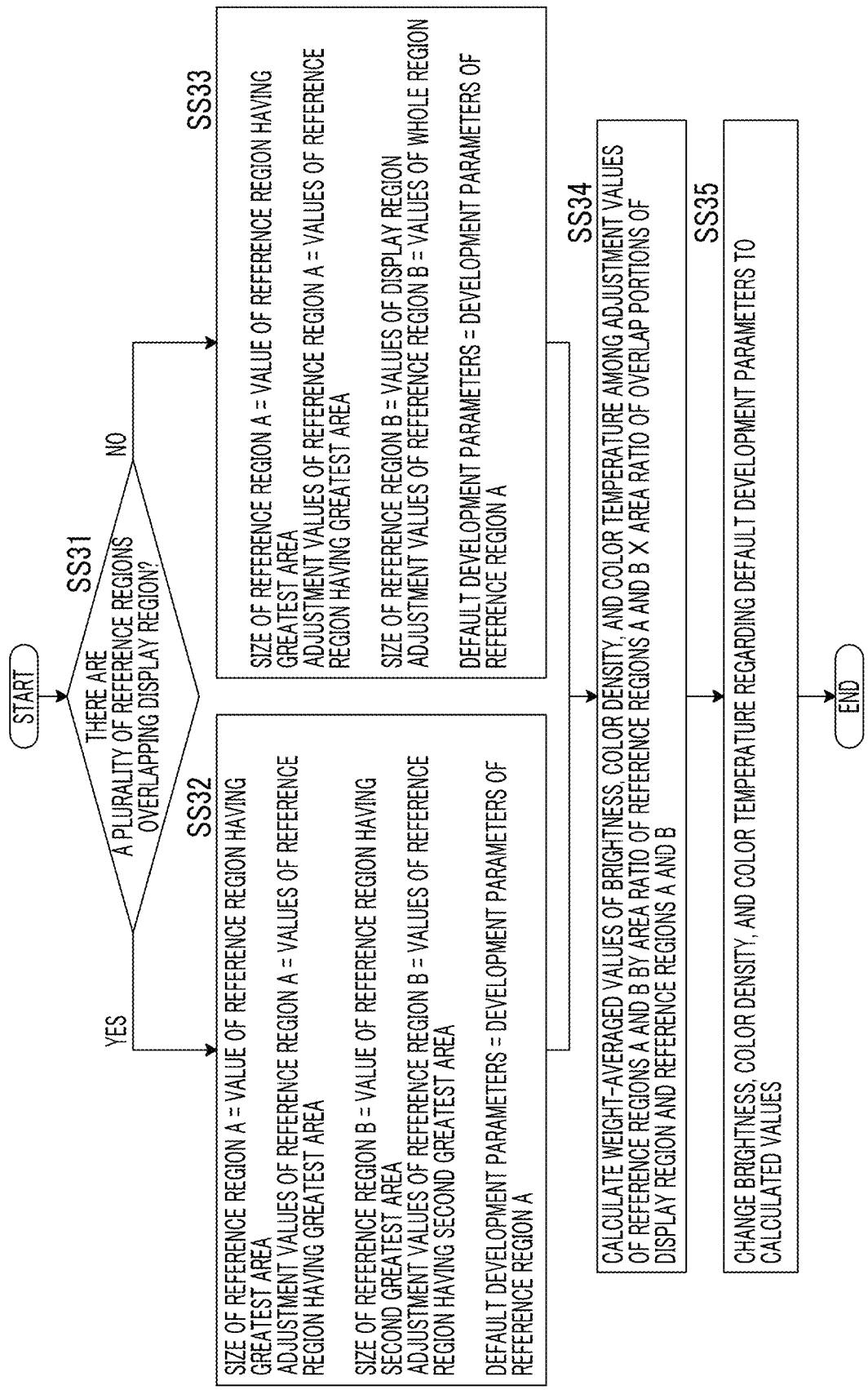

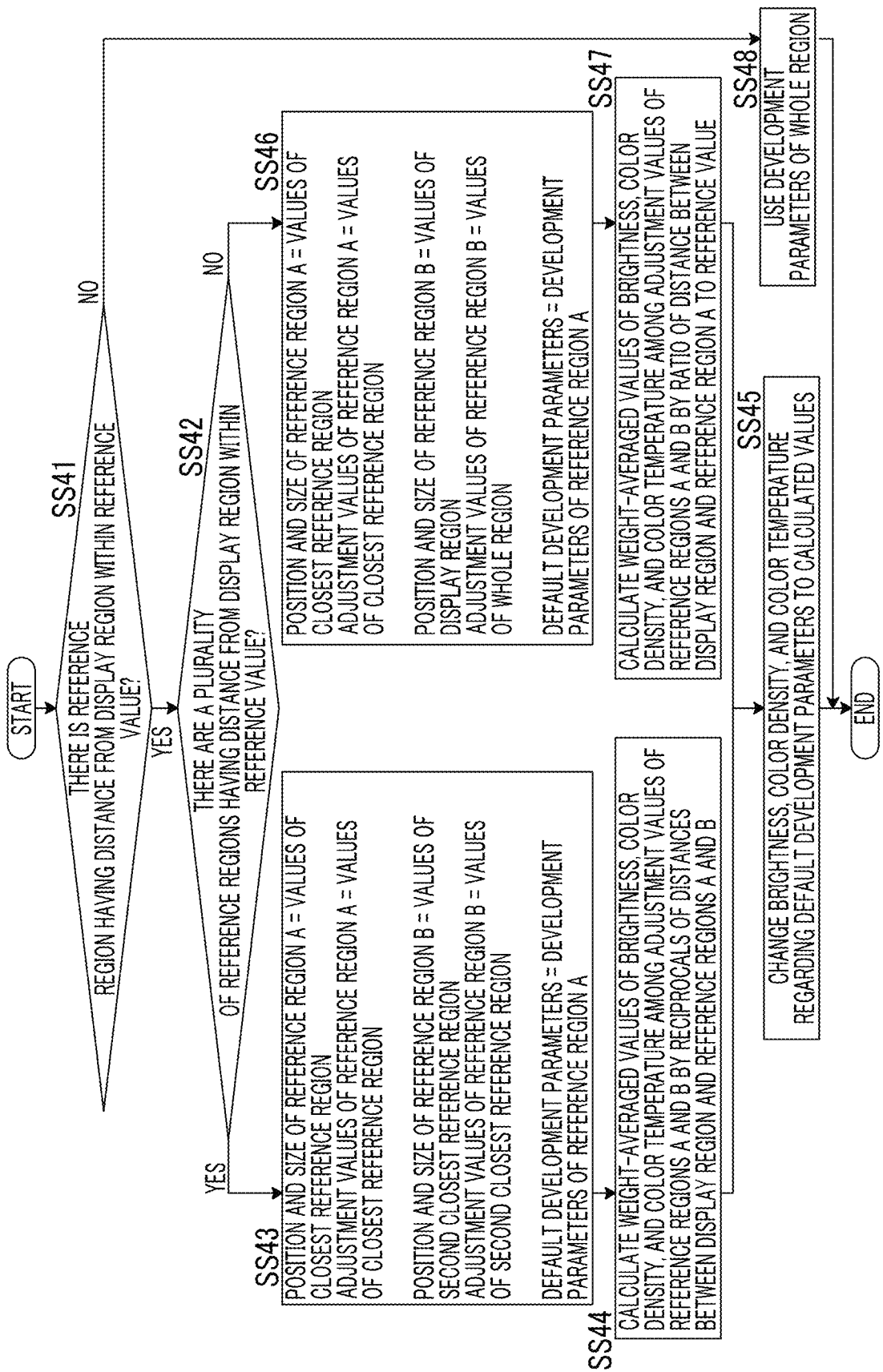

IMAGE PROCESSING DEVICE, IMAGE PROCESSING METHOD, AND IMAGE PROCESSING PROGRAM

CROSS-REFERENCE TO RELATED APPLICATIONS

This application is a continuation application of International Application No. PCT/JP2020/021429, filed on May 29, 2020, which is incorporated herein by reference in its entirety. Further, this application claims priority from Japanese Patent Application No. 2019-103132, filed on May 31, 2019, the disclosure of which is incorporated by reference herein in their entirety.

BACKGROUND

Technical Field

The present disclosure relates to an image processing device, an image processing method, and a non-transitory storage medium storing an image processing program.

Related Art

An image processing device executes development processing only on a partial region in an image indicated by RAW image data and displays a processed image has been suggested (see JP2004-40559A and JP2013-127819A).

The present disclosure is to provide an image processing device, an image processing method, and a non-transitory storage medium storing an image processing program capable of executing satisfactory image processing in a case of executing image processing on a partial region in an image indicated by image data.

SUMMARY

An image processing device according to an aspect of the present disclosure comprises at least one processor configured to set a reference region that is a partial region in an image indicated by image data, store, in association with the image data, information regarding the reference region including a position of the set reference region in the image and image processing parameters of the reference region, set a predetermined region in the image as a display region, and in a case where the reference region and the display region are different, generate image processing parameters of the display region based on the image processing parameters of the reference region and output a processed image obtained by executing image processing on the display region based on the generated image processing parameters of the display region.

In the image processing device of the above-described aspect, the processor may be configured to, in a case where there are a plurality of the reference regions, set priority of the reference regions indicating the image processing parameters given priority among the image processing parameters of the plurality of the reference regions as the information regarding the reference region, and the processor may be configured to generate the image processing parameters of the display region based on the priority of the reference region and the image processing parameters of the reference region.

In the image processing device of the above-described aspect, the processor may be configured to generate the image processing parameters of the display region based on a distance between the reference region and the display region and the image processing parameters of the reference region.

In the image processing device of the above-described aspect, the processor may be configured to generate the image processing parameters of the display region based on an area of the reference region and the image processing parameters of the reference region.

In the image processing device of the above-described aspect, the image data may be RAW image data, and the image processing executed by the processor may include development processing on the RAW image data.

An image processing method according to an aspect of the present disclosure comprises setting a reference region that is a partial region in an image indicated by image data, storing, in association with the image data, information regarding the reference region including a position of the set reference region in the image and image processing parameters of the reference region, setting a predetermined region in the image as a display region, and in a case where the reference region and the display region are different, generating image processing parameters of the display region based on the image processing parameters of the reference region and outputting a processed image obtained by executing image processing on the display region based on the generated image processing parameters of the display region.

A non-transitory storage medium according to an aspect of the present disclosure stores a program that causes a computer to execute an image processing comprising: setting a reference region that is a partial region in an image indicated by image data, storing, in association with the image data, information regarding the reference region including a position of the set reference region in the image and image processing parameters of the reference region, setting a predetermined region in the image as a display region, and in a case where the reference region and the display region are different, generating image processing parameters of the display region based on the image processing parameters of the reference region and outputting a processed image obtained by executing image processing on the display region based on the generated image processing parameters of the display region.

BRIEF DESCRIPTION OF THE DRAWINGS

FIG. 12 is a diagram showing an example of a data table of development parameters set for each piece of RAW image data.

FIG. 15 is a flowchart illustrating a flow of processing at the time of development parameter acquisition in the image processing device.

FIG. 16 is a table showing a development parameter calculation method of each form of a display region.

FIG. 17 is a table showing a development parameter calculation method of each form of a display region in an image display system according to a second embodiment.

FIG. 18 is a flowchart illustrating a flow of processing at the time of development parameter acquisition in an image processing device.

FIG. 19 is a flowchart illustrating a flow of processing at the time of development parameter acquisition in the image processing device.

DETAILED DESCRIPTION

First Embodiment

Figure 1:
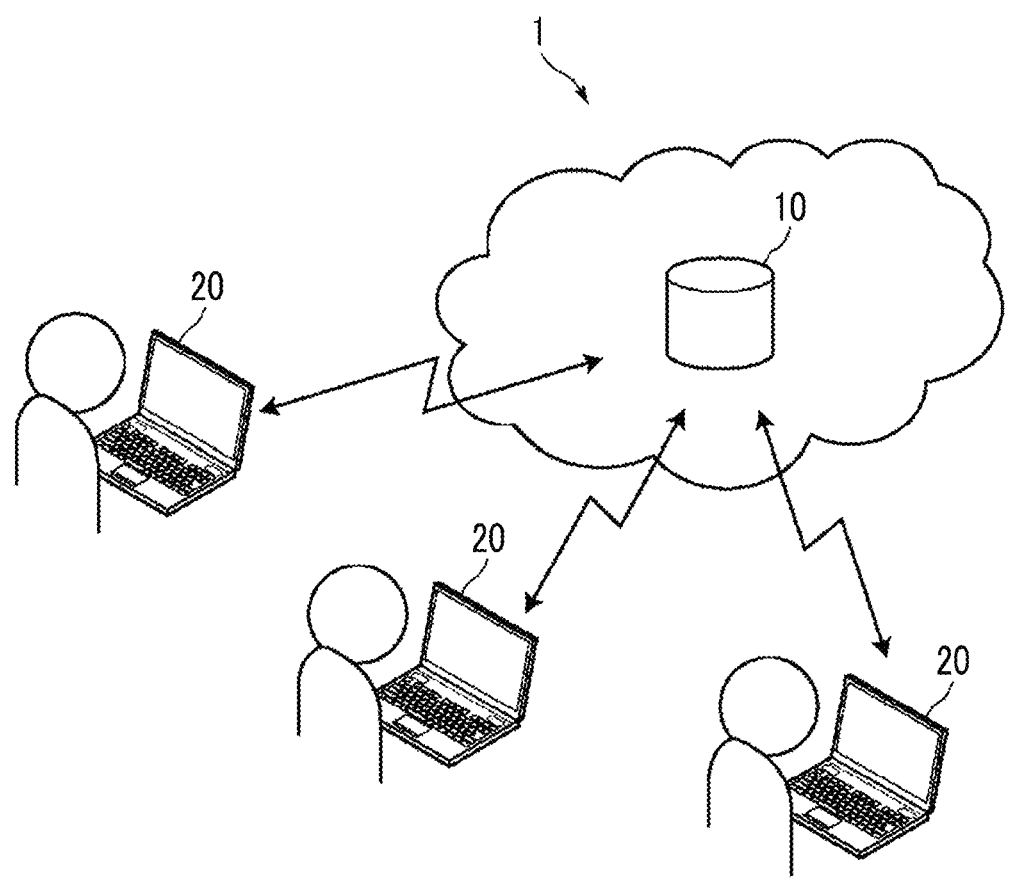
FIG. 1 is a schematic configuration diagram of an image display system to which an image processing device according to a first embodiment is applied.

Hereinafter, an embodiment of the present disclosure will be described referring to the drawings. FIG. 1 is a schematic configuration diagram of an image display system to which an image processing device according to a first embodiment of the present disclosure is applied. An image display system 1 shown in FIG. 1 is a system that development processing can be requested from a terminal connected to the image display system 1 through a network for RAW image data (an example of image data) managed on a cloud.

Figure 2:
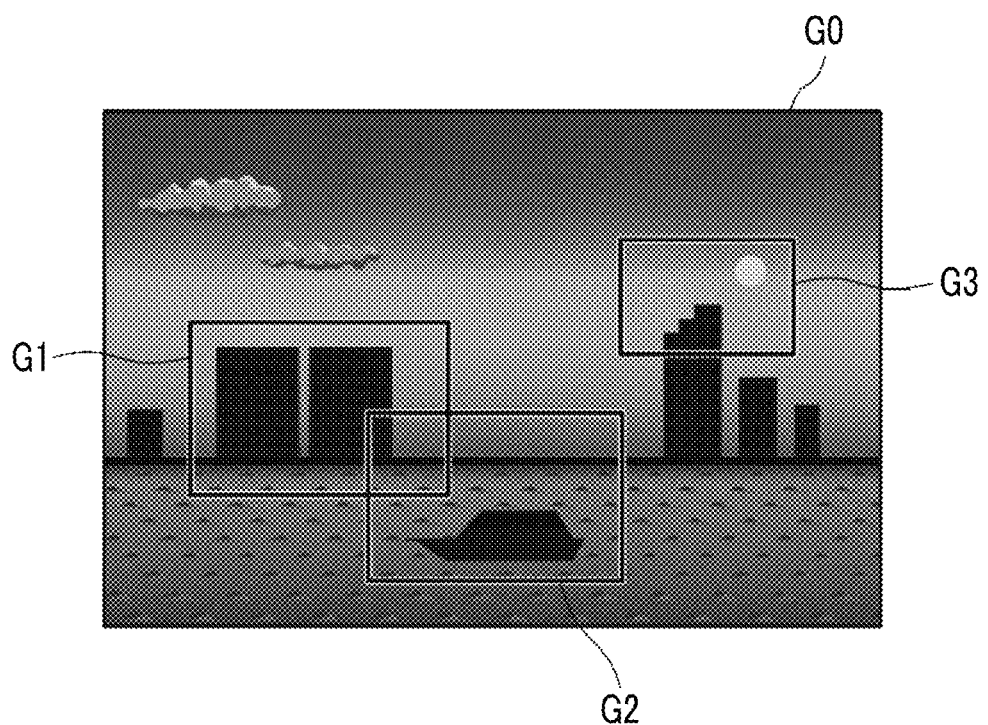
FIG. 2 is a diagram showing a display example of an image in the image display system.
Figure 3:
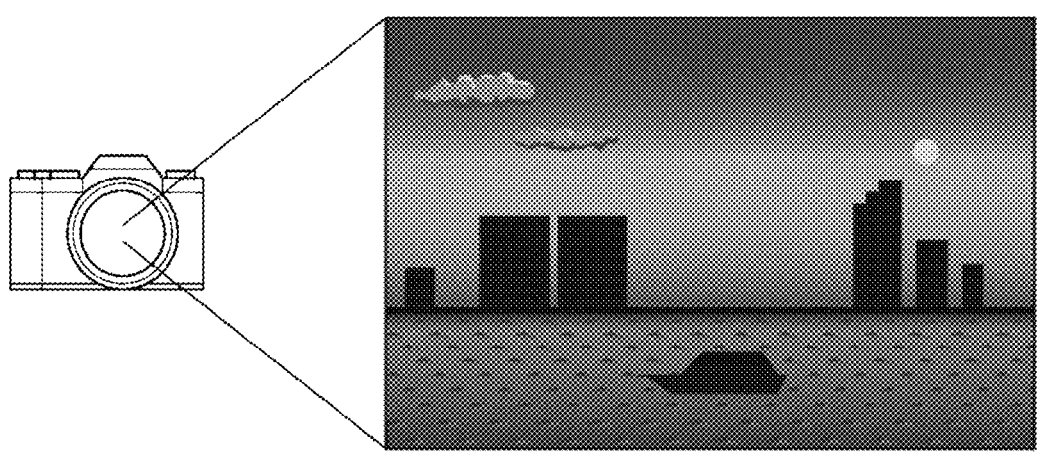
FIG. 3 is a diagram showing the configuration of the image shown in FIG. 2.
Figure 4:
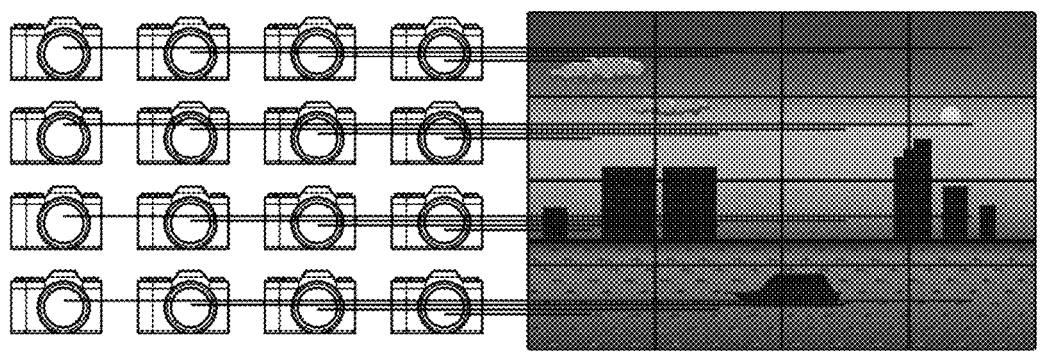
FIG. 4 is a diagram showing the configuration of the image shown in FIG. 2.
Figure 5:
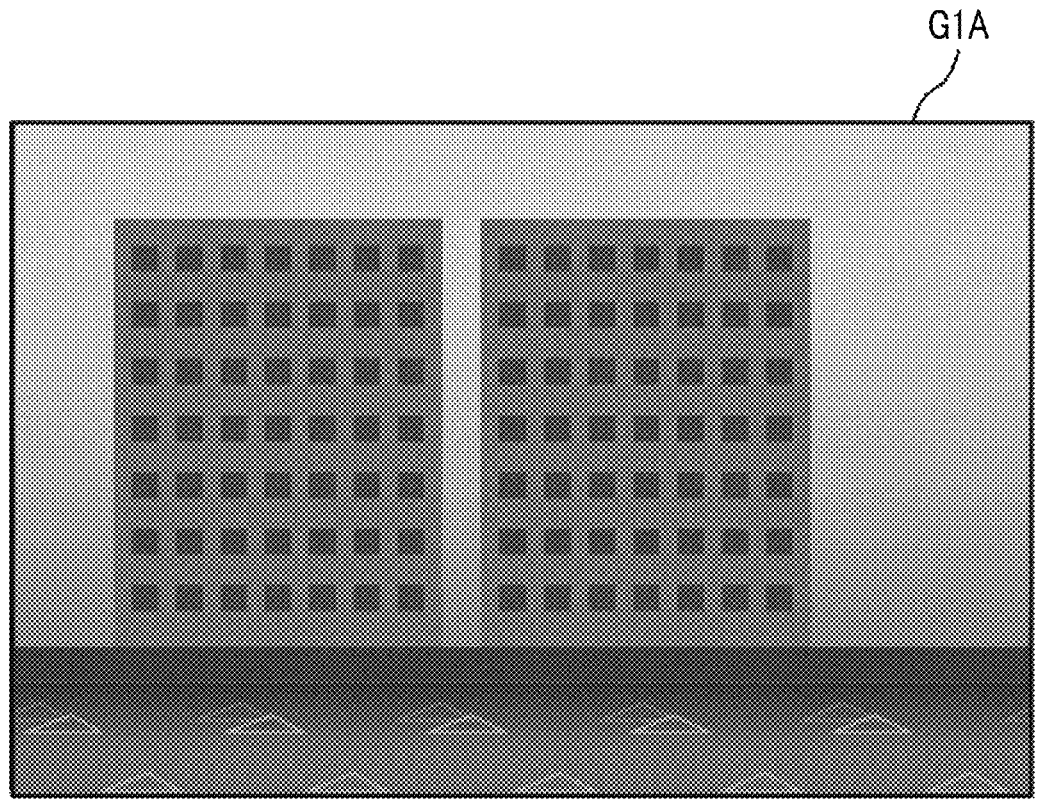
FIG. 5 is a diagram showing a state in which a part of the image shown in FIG. 2 is enlarged.
Figure 6:
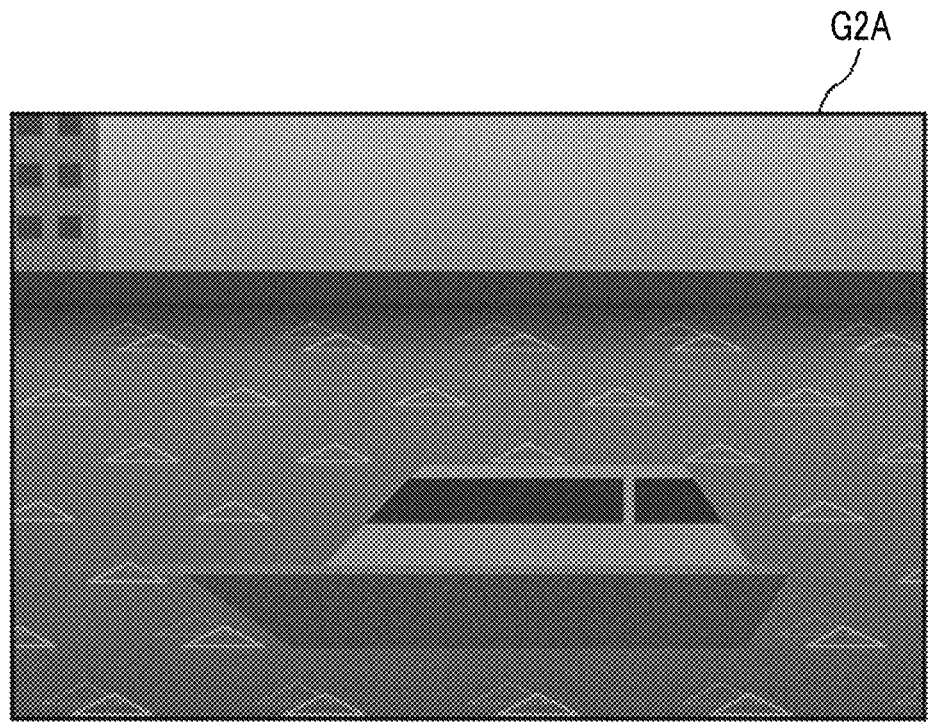
FIG. 6 is a diagram showing a state in which a part of the image shown in FIG. 2 is enlarged.
Figure 7:
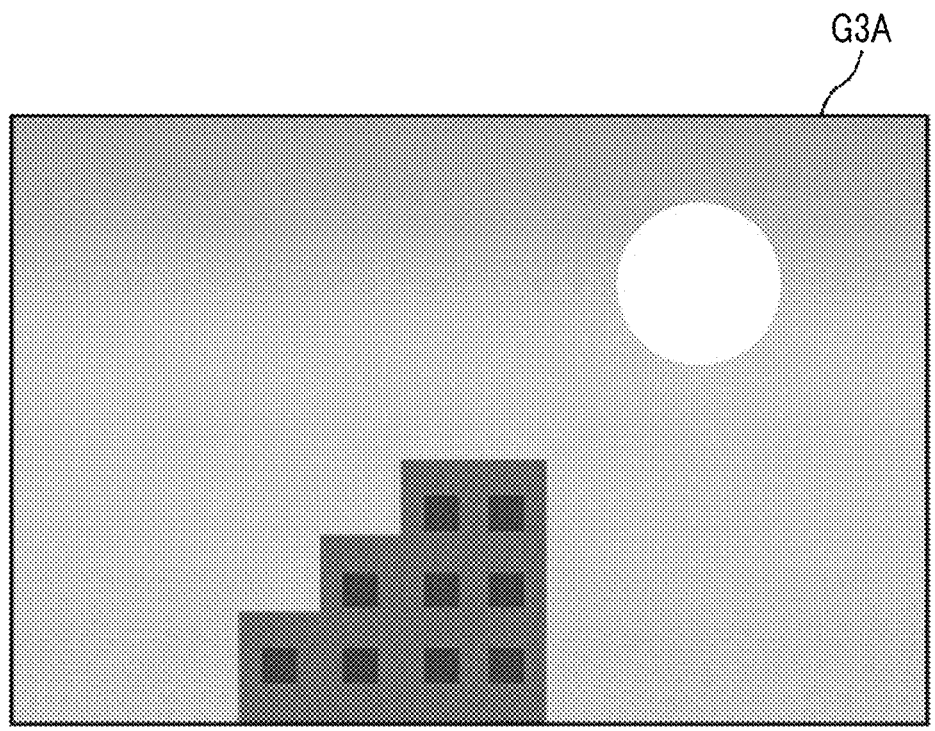
FIG. 7 is a diagram showing a state in which a part of the image shown in FIG. 2 is enlarged.

FIG. 2 is a diagram showing a display example of an image in the image display system. The image shown in FIG. 2 is a scenery image in which a street on an opposite bank crossing a river is shown, a yacht is floating on the river, and there is a plurality of building groups on the street on the opposite bank. The image shown in FIG. 2 is referred to as a whole image G0 in which the whole scenery is shown. The whole image G0 is an image generated by performing development based on RAW image data as an example of image data as described below. FIGS. 3 and 4 are diagrams showing the configuration of the whole image G0 shown in FIG. 2. FIGS. 5 to 7 are diagrams showing enlarged images G1A, G2A, and G3A obtained by enlarging a part of the whole image G0 shown in FIG. 2.

As shown in FIG. 1, the image display system 1 includes an image processing device 10 and a plurality of terminals 20 that can perform communication with the image processing device 10. The image processing device 10 and the terminal 20 are connected through a network, through the Internet, and the image processing device 10 looks like being above a cloud as viewed from the terminal 20. For this reason, the image processing device 10 connected to the terminal 20 through the network is referred to as a cloud. In the specification, the image processing device 10 may be hereinafter referred to as the cloud.

The image processing device 10 develops RAW image data based on an instruction from the terminal 20 and transmits image data after development to the terminal 20. In more detail, in a case where designation of RAW image data as a development target is received from the terminal 20, as shown in FIG. 2, the image processing device 10 generates the whole image G0 of the designated RAW image data and displays the whole image G0 on the terminal 20.

The resolution of the RAW image data that is handled by the image processing device 10 is, for example, 8K (for example, 7680×4320) resolution or a higher resolution. That is, extremely high-resolution RAW image data can be handled. The high-resolution RAW image data may be RAW image data captured by one high-resolution camera as shown in FIG. 3 or may be RAW image data obtained by combining image data captured by a plurality of cameras having a resolution lower than the camera shown in FIG. 3 into one image as shown in FIG. 4.

In a case where an instruction to enlarge and display only a partial region in the whole image G0 is received from the terminal 20, the image processing device 10 can enlarge the whole image G0 only on the designated region. For example, in the terminal 20, in a case where a display region G1 including a building group is designated from the whole image G0, as shown in FIG. 5, the image processing device 10 develops only display region G1 including the building group based on the RAW image data of the whole image G0 to generate an enlarged image G1A. Then, the image processing device 10 transmits the enlarged image G1A to the terminal 20. The terminal 20 displays the received enlarged image G1A.

In the terminal 20, in a case where a display region G2 including the yacht is designated from the whole image G0, as shown in FIG. 6, the image processing device 10 develops only the display region G2 including the yacht based on the RAW image data of the whole image G0 to generate the enlarged image G2A. Then, the image processing device 10 transmits the enlarged image G2A to the terminal 20. The terminal 20 displays the received enlarged image G2A.

In the terminal 20, in a case where a display region G3 including the sun is designated from the whole image G0, as shown in FIG. 7, the image processing device 10 develops only the display region G3 including the sun based on the RAW image data of the whole image G0 to generate the enlarged image G3A. Then, the image processing device 10 transmits the enlarged image G3A to the terminal 20. The terminal 20 displays the received enlarged image G3A.

Regarding development parameters (an example of image processing parameters) in generating the whole image G0 and the display regions G1 to G3, the image processing device 10 can perform development using individually different development parameters.

For example, as shown in FIG. 2, in the whole image G0, development is performed in a dark tone focusing on the whole atmosphere. As shown in FIGS. 5 to 7, in the display regions G1 to G3, development is performed in a brighter tone than the whole image G0 such that the detail of a subject of each region is easily understood.

Figure 8:
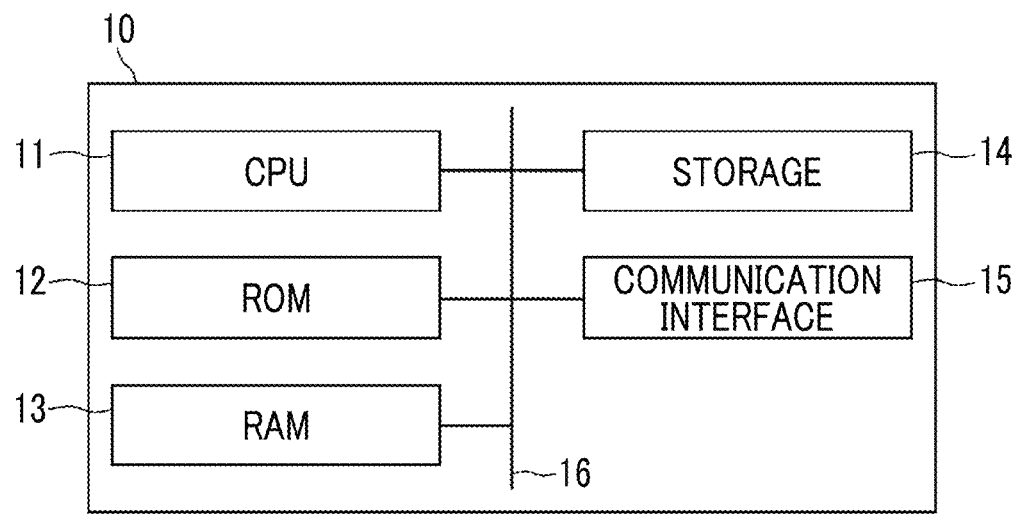
FIG. 8 is a block diagram showing the hardware configuration of the image processing device.

FIG. 8 is a block diagram showing the hardware configuration of the image processing device. As shown in FIG. 8, the image processing device 10 has a central processing unit (CPU: processor) 11, a read only memory (ROM) 12, a random access memory (RAM) 13, a storage 14, and a communication interface 15. The respective configurations are connected to be communicable with one another through a bus 16. The image processing device 10 configures a so-called server.

The CPU 11 is a central arithmetic processing unit and executes various programs or controls respective units. That is, the CPU 11 reads programs from the ROM 12 or the storage 14 and executes the programs with the RAM 13 as a work area. The CPU 11 controls the above-described configurations and executes various kinds of arithmetic processing in association with the programs recorded in the ROM 12 or the storage 14. In the embodiment, an image processing program is stored in the ROM 12 or the storage 14.

The ROM 12 stores various programs and various kinds of data. The RAM 13 temporarily stores a program or data as a work area. The storage 14 is configured with a hard disk drive (HDD) or a solid state drive (SSD) and stores various programs including an operating system and various kinds of data including RAW image data.

The communication interface 15 is an interface that is provided for the image processing device 10 to perform communication with the terminal 20 and other kinds of equipment, and for example, a standard, such as Ethernet (®), Fiber Distributed Data Interface (FDDI), or Wi-Fi (®), is used.

In executing the above-described image processing program, the image processing device 10 realizes various functions using the above-described hardware resources. The functional configuration that is realized by the image processing device 10 will be described.

Figure 9:
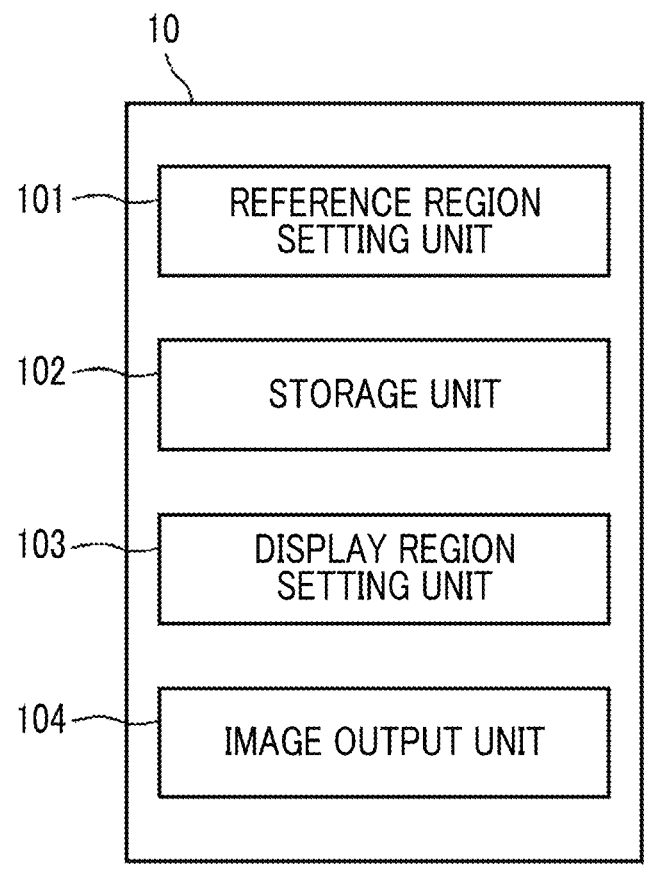
FIG. 9 is a block diagram showing an example of the functional configuration of the image processing device.

FIG. 9 is a block diagram showing an example of the functional configuration of the image processing device. As shown in FIG. 9, the image processing device 10 has, as the functional configuration, a reference region setting unit 101, a storage unit 102, a display region setting unit 103, and an image output unit 104. The functional configurations are realized by the CPU 11 reading and executing the image processing program stored in the ROM 12 or the storage 14.

The reference region setting unit 101 sets a reference region that is a partial region in an image indicated by RAW image data.

The storage unit 102 stores information regarding the reference region that includes a position of the set reference region in the image and image processing parameters of the reference region, in association with the image data.

The display region setting unit 103 sets any region in the image as a display region.

The image output unit 104 generates image processing parameters of the display region based on the image processing parameter of the reference region in a case where the reference region and the display region are different and outputs a processing image obtained by executing development processing on the display region based on the generated image processing parameters of the display region.

Figure 10:
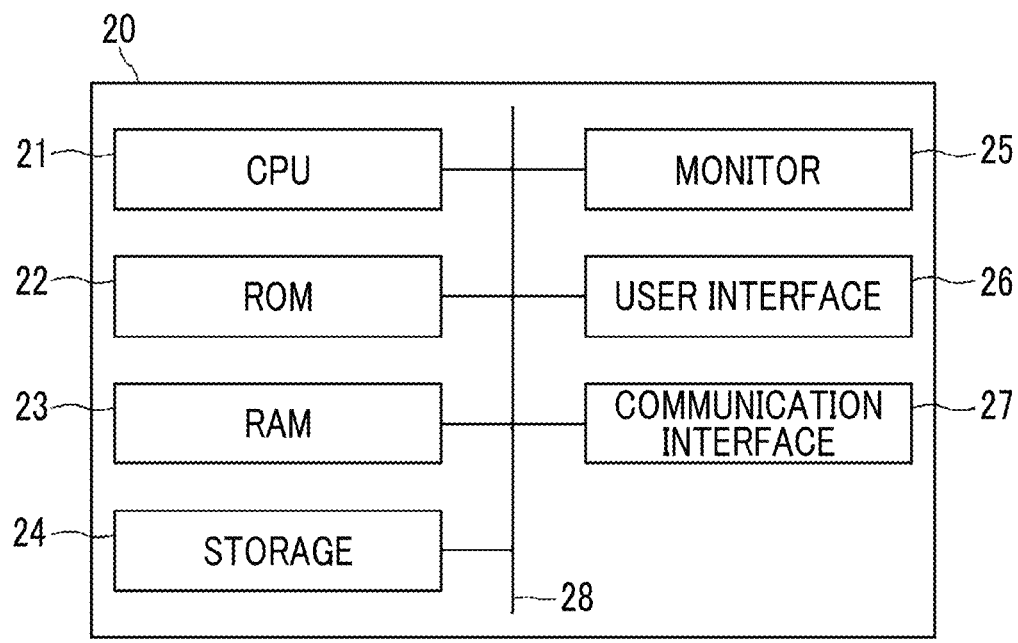
FIG. 10 is a block diagram showing the hardware configuration of a terminal.

FIG. 10 is a block diagram showing the hardware configuration of the terminal. As shown in FIG. 10, the terminal 20 has a CPU 21, a ROM 22, a RAM 23, a storage 24, a monitor 25, a user interface 26, and a communication interface 27. The respective configurations are connected to be communicable with one another through a bus 28.

The CPU 21 is a central arithmetic processing unit and executes various programs or control respective units. That is, the CPU 21 reads programs from the ROM 22 or the storage 24 and executes the programs with the RAM 23 as a work area. The CPU 21 controls the above-described configurations and executes various kinds of arithmetic processing in association with the programs recorded in the ROM 22 or the storage 24.

The ROM 22 stores various programs and various kinds of data. The RAM 23 temporarily stores a program or data as a work area. The storage 24 is configured with a hard disk drive (HDD) or a solid state drive (SSD) and stores various programs including an operating system and various kinds of data. Various programs include an image display application described below.

The monitor 25 is configured using a display device, such as a liquid crystal display or an organic electroluminescence (EL) display.

The user interface 26 is an interface that is used when a user, such as an editor or a viewer, uses the terminal 20. The user interface 26 includes, for example, at least one of a display comprising a touch panel that allows the user to perform a touch operation, a keyboard, or a mouse.

The communication interface 27 is an interface that is provided for the terminal 20 performing communication with the image processing device 10 and other kinds of equipment, and for example, a standard, such as Ethernet (®), FDDI, or Wi-Fi (®), is used.

[Flow of Processing]

Figure 11:
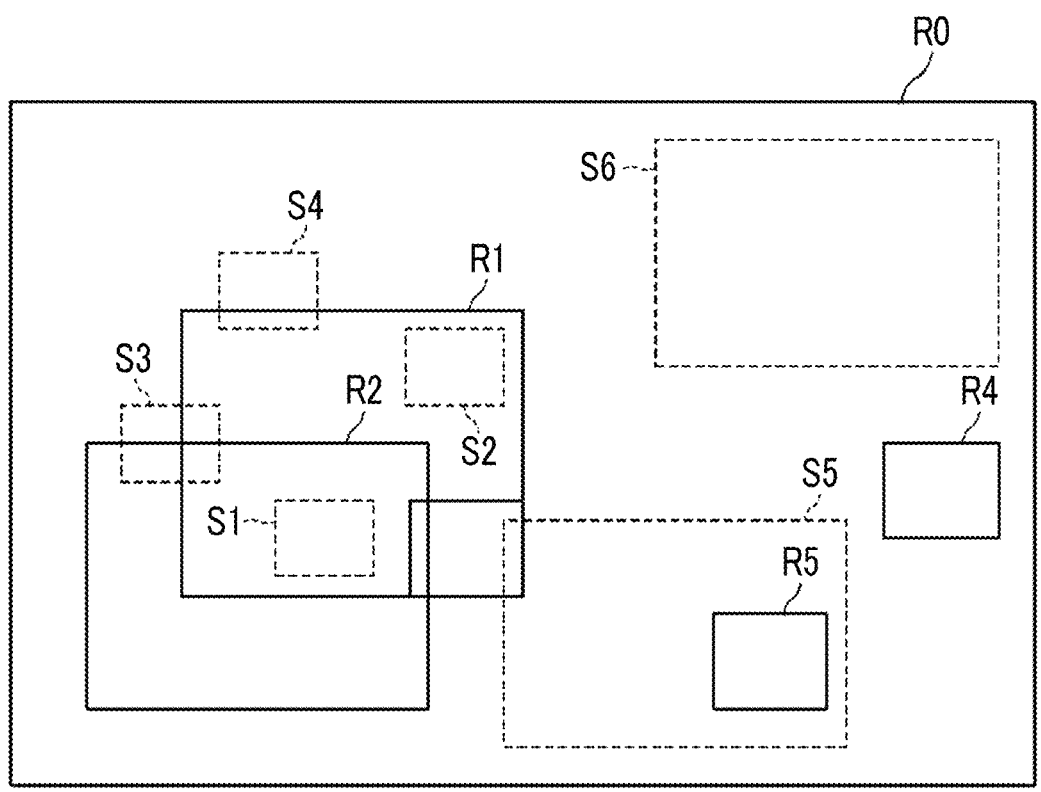
FIG. 11 is a diagram showing a relationship between a reference region and a display region in an image.

Next, processing that is executed in the embodiment will be described. FIG. 11 is a diagram showing a relationship between a reference region and a display region in an image.

In the image processing device 10, prior to image display, development parameters necessary for development are set for each piece of RAW image data. Specifically, as shown in FIG. 11, in regard to a whole region R0 of an image indicated by RAW image data, development parameters are set by an editor. In regards to reference regions R1 to R5 that are partial regions in the image indicated by the RAW image data, coordinates, a size, priority, and development parameters of each reference region are set by the editor. The setting of the items is performed by the editor through the terminal 20.

A form of subdividing the whole region of high-resolution RAW image data and individually setting development parameter on all subdivided regions is not realistic since a lot of labor is taken. For this reason, in general, the reference region on which the development parameters are set is provided at several places on regions around subjects in which a viewer is likely to be interested in the whole region R0 for each piece of RAW image data.

FIG. 12 is a diagram showing an example of a data table of development parameters and the like set for each piece of RAW image data. The data table of FIG. 12 has the number of reference regions, coordinates, an area, and the like not corresponding to the image shown in FIG. 11, and merely shows an example of the contents of the data table.

As shown in FIG. 12, the data table includes information regarding start point coordinates, a region size, priority, an area ratio to the whole region, and development parameters on the whole region 0 and a plurality of reference regions 1, 2, 3, . . . . The development parameters include parameters, such as Brightness, Color Density, Color Temperature, Film Mode (F-mode in FIG. 12), Sharpness, and Noise.

The data table described above may be created by one editor through the terminal 20 or may be created by a plurality of editors through a plurality of terminals 20.

In the image processing device 10, the RAW image data and the data table are associated with each other and stored in the storage 14.

Figure 13:
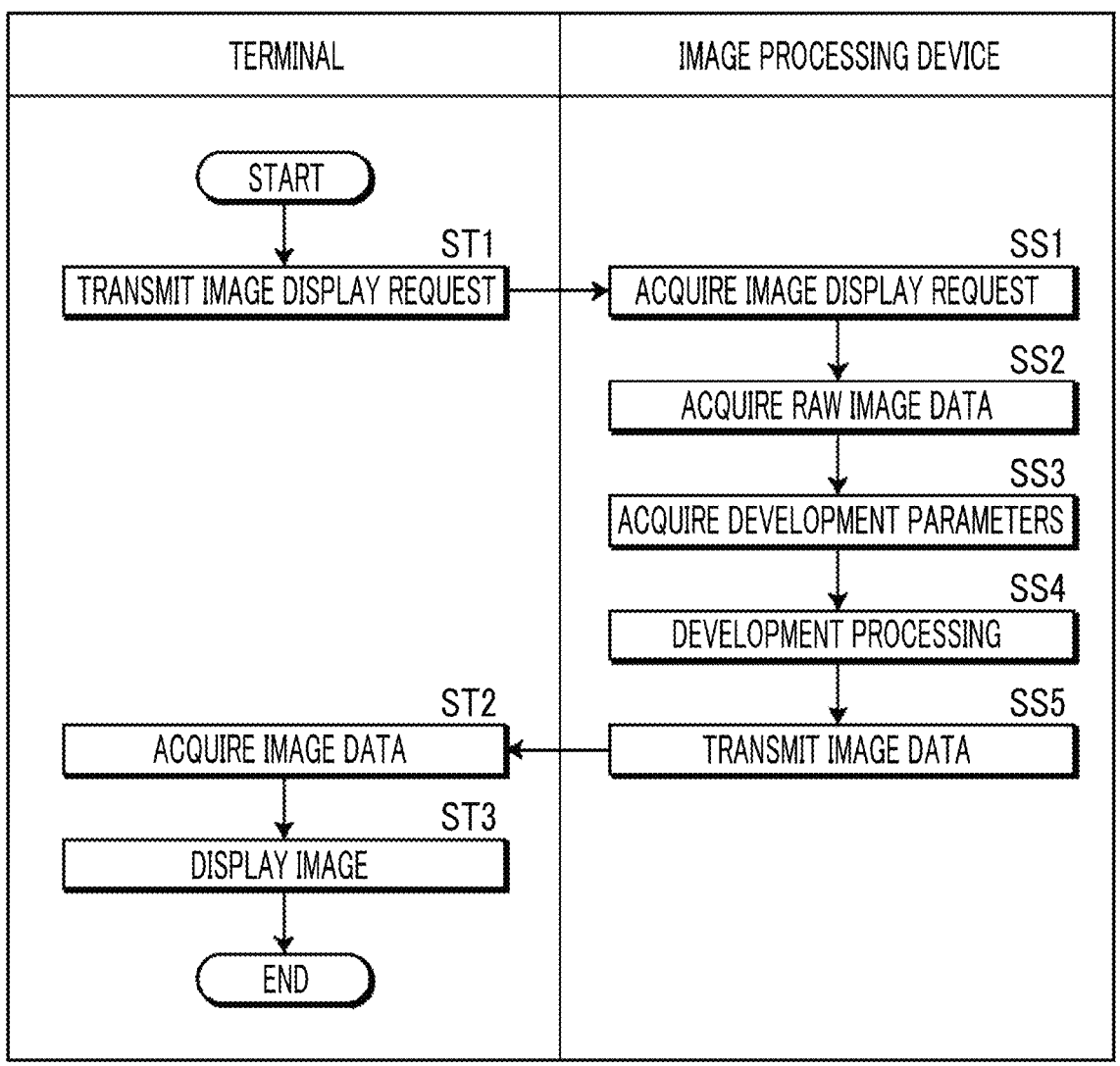
FIG. 13 is a flowchart illustrating a flow of processing at the time of image display in the image display system.

Next, processing at the time of image display will be described. FIG. 13 is a flowchart illustrating a flow of processing at the time of image display in the image display system.

After the data table is created as described above by the editor, the editor or users other than the editor can perform image display by designating a display region without setting the development parameter on the RAW image data.

Hereinafter, the users at the time of image display are collectively described as a viewer.

As shown in FIG. 13, in a case where a viewer of an image inputs RAW image data to be displayed and a display region in the designated RAW image data through an image display application activated in the terminal 20, the CPU 21 transmits an image display request including specification information of the RAW image data and display region information to the image processing device 10 (Step ST1). In regard to the input of the display region, any rectangular region in an image indicated by the RAW image data can be set as a display region through the user interface 26.

In a case where the image display request including the specification information of the RAW image data and the display region is acquired from the terminal 20 in the image processing device 10 (Step SS1), the CPU 11 acquires the RAW image data from the storage 14 (Step SS2). Next, the CPU 11 acquires development parameters for developing the RAW image data (Step SS3).

Figure 14:
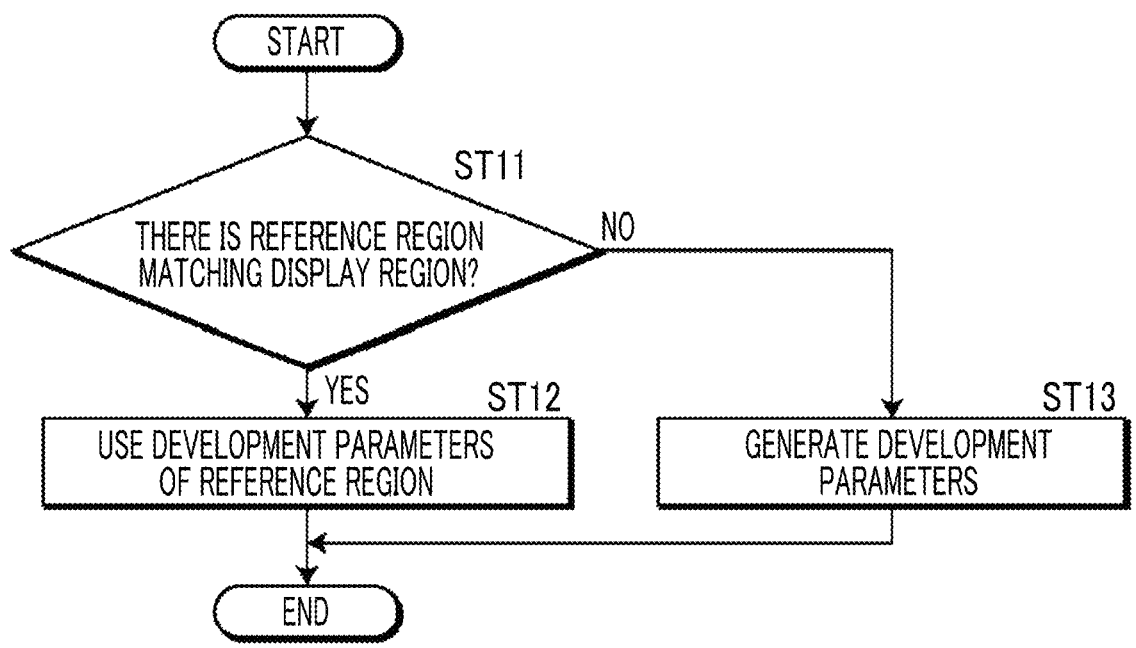
FIG. 14 is a flowchart illustrating a flow of processing at the time of development parameter acquisition in the image processing device.

Here, the acquisition of the development parameters will be described in detail. FIGS. 14 and 15 are flowcharts illustrating a flow of processing at the time of development parameter acquisition in the image processing device. FIG. 16 is a table showing a development parameter calculation method of each form of a display region.

As shown in FIG. 14, the CPU 11 determines whether or not there is a reference region matching the display region designated in the terminal 20 (Step SS11). In Step SS11, in a case where determination is made that there is a reference region matching the display region (a determination result is Yes), the CPU 11 refers to the data table stored in the storage 14 and acquires the development parameters of the reference region matching the display region as the development parameters of the display region (Step SS12). Then, the process progresses to Step SS4 of the flowchart of FIG. 13.

In Step SS11, in a case where determination is made that there is no reference region matching the display region (a determination result is No), the CPU 11 refers to the data table stored in the storage 14 and generates the development parameters of the display region based on the development parameters of the reference region (Step SS13).

Here, the processing in Step SS13 will be described in detail. As shown in FIG. 15, the CPU 11 determines whether or not there is a reference region completely including the display region designated in the terminal 20 (Step SS21). In Step SS21, in a case where determination is made that there is a reference region completely including the display region (a determination result is Yes), the CPU 11 further determines whether or not there are a plurality of reference regions completely including the display region (Step SS22). In FIG. 11, display regions S1 and S2 correspond to determination to be Yes in Step SS21.

In Step SS22, in a case where determination is made that there are a plurality of reference regions completely including the display region (a determination result is Yes), the CPU 11 determines the display region as a multi-encompassed region and calculates the development parameters (Step SS23). The display region as the multi-encompassed region corresponds to the display region S1 in FIG. 11. In regard to a calculation method of the development parameters on the display region as the multi-encompassed region, as shown in FIG. 16, the CPU 11 refers to the data table stored in the storage 14 and acquires the development parameters of the reference region having the highest priority among the reference regions completely including the display region as the development parameters of the display region. Then, the process progresses to Step SS4 of the flowchart of FIG. 13.

In Step SS22, in a case where determination is made that there are no plurality of reference regions completely including the display region (that is, there is only one reference region) (a determination result is No), the CPU 11 determines the display region as a single encompassed region and calculates the development parameters (Step SS24). The display region as the single encompassed region corresponds to the display region S2 in FIG. 11. In regard to a calculation method of the development parameters on the display region as the single encompassed region, as shown in FIG. 16, the CPU 11 refers to the data table stored in the storage 14 and acquires the development parameters of the reference region completely including the display region as the development parameters of the display region. Then, the process progresses to Step SS4 of the flowchart of FIG. 13.

In Step SS21, in a case where determination is made that there is no reference region completely including the display region (a determination result is No), the CPU 11 further determines whether or not there is a reference region overlapping the display region (Step SS25). In FIG. 11, display regions S3, S4, S5, and S6 correspond to determination to be No in Step SS21.

In Step SS25, in a case where determination is made that there is a reference region overlapping the display region (a determination result is Yes), the CPU 11 determines the display region as a partial-share region and calculates the development parameters (Step SS26). The display region as the partial-share region corresponds to the display regions S3, S4, and S5 in FIG. 11. In regard to a calculation method of the development parameters on the display region as the partial-share region, as shown in FIG. 16, the CPU 11 refers to the data table stored in the storage 14 and acquires the development parameters of the reference region having the highest priority among the reference regions having an overlap as the development parameters of the display region. Then, the process progresses to Step SS4 of the flowchart of FIG. 13.

In Step SS25, in a case where determination is made that there is no reference region overlapping the display region (a determination result is No), the CPU 11 determines the display region as an isolated region and calculates the development parameters (Step SS27). The display region as the isolated region corresponds to the display region S6 in FIG. 11. In regard to a calculation method of the development parameter on the display region as the isolated region, as shown in FIG. 16, the CPU 11 refers to the data table stored in the storage 14 and acquires the development parameters of the whole region as the development parameters of the display region. Then, the process progresses to Step SS4 of the flowchart of FIG. 13.

Returning to the flowchart of FIG. 13, the CPU 11 performs development processing on the display region based on the acquired development parameters (Step SS4). The CPU 11 transmits image data obtained as a result of the development processing to the terminal 20 (Step SS5).

In the terminal 20, the CPU 21 acquires image data from the image processing device 10 (Step ST2), displays the acquired image data on the monitor 25 (Step ST3), and ends the process.

[Operations and Effects]

In the image processing device of JP2004-40559A and JP2013-127819A of the related art, in a case of displaying a partial region in an image indicated by RAW image data, it is not possible to perform development processing on a display region on which development parameters are not set. For this reason, in a case of enlarging and displaying the display region on which the development parameters are not set, or the like, there is a need to cut the display region from the whole image and enlarge and display the display regions, resulting in degradation of image quality.

In contrast, prior to image display, the image processing device 10 of the embodiment sets the reference region that is a partial region in the image indicated by the RAW image data (an example of image data), and stores information regarding the reference region including the position of the reference region in the image and the development parameters (an example of image processing parameters) of the reference region in association with the RAW image data. Then, in a case where the display region designated in the terminal 20 and the reference region are different, the development parameters of the display region are generated based on the development parameters of the reference region, and an image obtained by executing image processing on the display region based on the generated development parameters of the display region is output.

With this, since even the display region not matching the reference region can be developed directly from the RAW image data, it is possible to execute satisfactory development processing conforming to the display region.

In a case where there are a plurality of reference regions, the priority of each reference region is set, and the image processing parameters of the display region are generated based on the priority of the reference region and the image processing parameters of the reference region. With this, it is possible to execute the development processing reflecting an editor's intention on the display region not matching the reference region.

Second Embodiment

Next, a second embodiment of the present disclosure will be described. In an image display system of the embodiment, only a calculation method of the development parameters of each form of a display region is different from the calculation method in the first embodiment, and other portions are common to the first embodiment. For this reason, description of the contents overlapping the first embodiment will not be repeated. FIG. 17 is a table showing a development parameter calculation method of each form of a display region.

In Step SS22 of the flowchart of FIG. 15, in a case where determination is made that there are a plurality of reference regions completely including the display region (a determination result is Yes), the CPU 11 determines the display region as a multi-encompassed region and calculates the development parameters (Step SS23). In regard to a calculation method of the development parameters on the display region as the multi-encompassed region, as shown in FIG. 17, the CPU 11 refers to the data table stored in the storage 14 and acquires the development parameters of the reference region having the smallest area among the reference regions completely including the display region as the development parameters of the display region. Then, the process progresses to Step SS4 of the flowchart of FIG. 13.

In Step SS22 of the flowchart of FIG. 15, in a case where determination is made that there are no plurality of reference regions completely including the display region (that is, there is only one reference region) (a determination result is No), the CPU 11 determines the display region as a single encompassed region and calculates the development parameters (Step SS24). In regard to a calculation method of the development parameters on the display region as the single encompassed region, as shown in FIG. 17, the CPU 11 refers to the data table stored in the storage 14 and acquires the development parameters of the reference region completely including the display region as the development parameters of the display region. Then, the process progresses to Step SS4 of the flowchart of FIG. 13.

In Step SS25 of the flowchart of FIG. 15, in a case where determination is made that there is a reference region overlapping the display region (a determination result is Yes), the CPU 11 determines the display region as a partial-share region and calculates the development parameters (Step SS26). In regard to a calculation method of the development parameters on the display region as the partial-share region, as shown in FIG. 17, the development parameters are calculated by a calculation method taking into consideration the area of the reference region.

Here, the calculation method taking into consideration the area of the reference region will be described in detail. FIG. 18 is a flowchart illustrating the calculation method taking into consideration the area of the reference region.

As shown in FIG. 18, the CPU 11 determines whether or not there are a plurality of reference regions overlapping the display region designated in the terminal 20 (Step SS31). In Step SS31, in a case where determination is made that there are a plurality of reference regions overlapping the display region (a determination result is Yes), the CPU 11 performs setting that size of reference region A=value of reference region having greatest area, adjustment values of reference region A=values of reference region having greatest area, size of reference region B=value of reference region having second greatest area, adjustment values of reference region B=value of reference region having second greatest area, and default development parameters=development parameters of reference region A (Step SS32).

In Step SS31, in a case where determination is made that there are no plurality of reference regions overlapping the display region (a determination result is No), the CPU 11 performs setting that size of reference region A=value of reference region having greatest area, adjustment values of reference region A=values of reference region having greatest area, size of reference region B=value of display region, adjustment values of reference region B=values of whole region, and default development parameters=development parameters of reference region A (Step SS33).

After Step SS32 or SS33, the CPU 11 calculates weight-averaged values of Brightness, Color Density, and Color Temperature among the adjustment values of the reference regions A and B by area ratio of reference regions A and B×area ratio of overlap portions of the display region and the reference regions A and B (Step SS34).

Specifically, the weight-averaged values are calculated by the following expression.

$$P=Pa\cdot\{A/(A+B)\}\cdot\{a/(a+b)\}+Pb\cdot\{B/(A+B)\}\cdot\{b/(a+b)\}$$

Here,
P: weight-averaged value
Pa, Pb: development parameters of reference regions A and B
A, B: areas of reference regions A and B
a, b: areas of overlap portions of display region and reference regions A and B Next, the CPU 11 changes Brightness, Color Density, and Color Temperature on the default development parameters to the calculated values (Step SS35). Then, the process progresses to Step SS4 of the flowchart of FIG. 13.

In Step SS25 of the flowchart of FIG. 15, in a case where determination is made that there is no reference region overlapping the display region (a determination result is No), the CPU 11 determines the display region as an isolated region and calculates the development parameters (Step SS27). In regard to a calculation method of the development parameters on the display region as the isolated region, as shown in FIG. 17, the development parameters are calculated by a calculation method taking into consideration a distance between the reference region and the display region.

Figure 20:
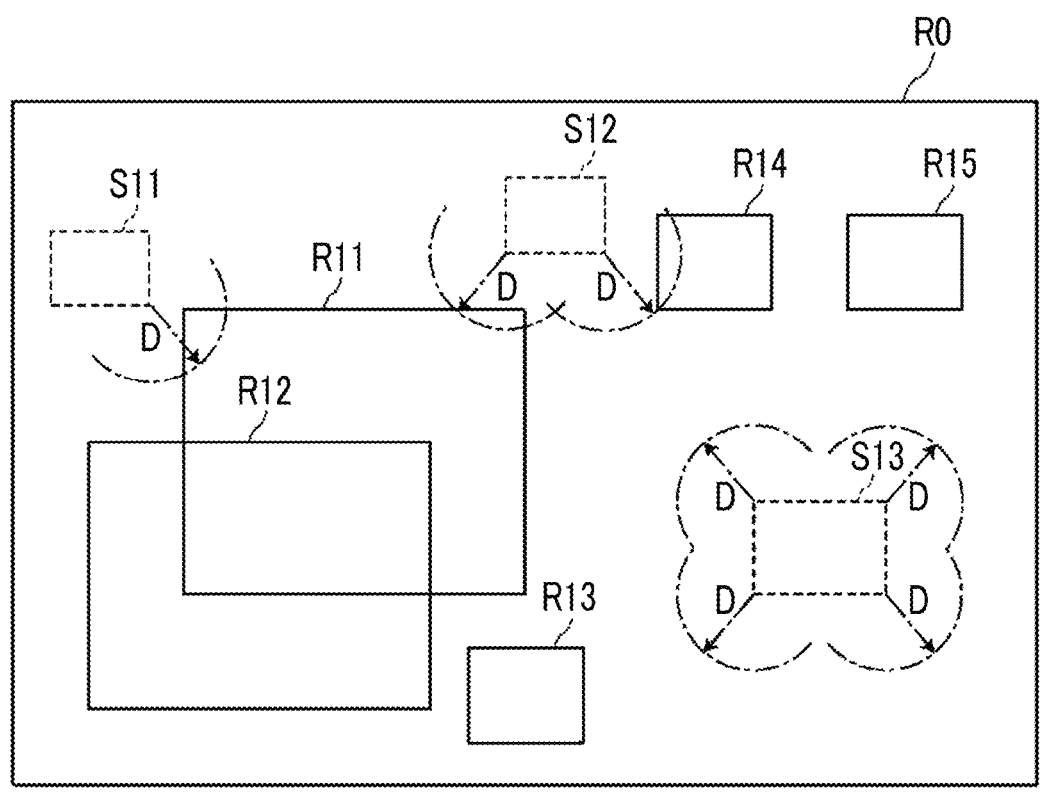
FIG. 20 is a diagram showing a relationship between a reference region and a display region in an image.

Here, the calculation method taking into consideration the distance between the reference region and the display region will be described in detail. FIG. 19 is a flowchart illustrating the calculation method taking into consideration an area of the reference region. FIG. 20 is a diagram showing a relationship between a reference region and a display region in an image.

As shown in FIG. 19, the CPU 11 determines whether or not there is a reference region having a distance from the display region designated in the terminal 20 within a reference value D (Step SS41). In regard to the determination in this case, as shown in a display region S13 of FIG. 20, determination is made whether or not there is a reference region in a region at a distance from each of four apexes of the display region within the reference value D. In Step SS41, in a case where determination is made that there is a reference region having a distance from the display region within the reference value D (a determination result is Yes), the CPU 11 determines whether or not there are a plurality of reference regions having a distance from the display region designated in the terminal 20 within the reference value D (Step SS42).

In Step SS42, in a case where determination is made that there are a plurality of reference regions having a distance from the display region within the reference value D (a determination result is Yes), the CPU 11 performs setting that position and size of reference region A=values of closest reference region, adjustment values of reference region A=values of closest reference region, position and size of reference region B=values of second closest reference region, adjustment values of reference region B=values of second closest reference region, and default development parameters=development parameters of reference region A (Step SS43). In FIG. 20, a display region S12 corresponds to this aspect.

Next, the CPU 11 calculates weight-averaged value of Brightness, Color Density, and Color Temperature among the adjustment values of the reference regions A and B by reciprocals of distances between the display region and the reference regions A and B (Step SS44).

Specifically, the weight-averaged values are calculated by the following expression.

$$P=Pa \cdot \{Da/(Da+db)\}+Pb \cdot \{db/(Da+db)\}$$

Here,
P: weight-averaged value
Pa, Pb: development parameters of reference regions A and B
Da, db: distances between display region and reference regions A and B Next, the CPU 11 changes Brightness, Color Density, and Color Temperature on the default development parameters to the calculated values (Step SS45). Then, the process progresses to Step SS4 of the flowchart of FIG. 13.

In Step SS42, in a case where determination is made that there are no plurality of reference regions having a distance from the display region within the reference value D (a determination result is No), the CPU 11 performs setting that position and size of reference region A=values of closest reference region, adjustment values of reference region A=values of closest reference region, position and size of reference region B=values of display region, adjustment values of reference region B=values of whole region, and default development parameters=development parameters of reference region A (Step SS46). In FIG. 20, a display region S11 corresponds to this aspect.

Next, the CPU 11 calculates weight-averaged values of Brightness, Color Density, and Color Temperature among the adjustment values of the reference regions A and B by a ratio of the distance between the display region and the reference region A to the reference value D (Step SS47).

Specifically, the weight-averaged values are calculated by the following expression.

$$P=Pa \cdot (D-d)/D+Pb \cdot d/D$$

Here,
P: weight-averaged value
Pa, Pb: development parameters of reference regions A and B
D: reference value
d: distance between reference regions A and B Next, the CPU 11 changes Brightness, Color Density, and Color Temperature on the default development parameters to the calculated values (Step SS45). Then, the process progresses to Step SS4 of the flowchart of FIG. 13.

In Step SS41, in a case where determination is made that there is no reference region having a distance from the display region within the reference value D (a determination result is No), the CPU 11 refers to the data table stored in the storage 14 and acquires the development parameters of the whole region as the development parameters of the display region (Step SS48). In FIG. 20, the display region S13 corresponds to this aspect. Then, the process progresses to Step SS4 of the flowchart of FIG. 13.

[Operations and Effects]

In the embodiment, it is also possible to obtain the same effects as in the above-described first embodiment.

Since the development parameters are calculated on the display region as the partial-share region by the calculation method taking into consideration the area of the reference region, it is possible to execute development processing reflecting an editor's intention.

Since the development parameters are calculated on the display region as the isolated region by the calculation method taking into consideration the distance between the reference region and the display region, it is possible to execute development processing reflecting an editor's intention.

Modification Examples

Although the present disclosure has been described based on the preferred embodiments, embodiments to which the present disclosure can be applied are not limited to the above-described embodiments.

For example, image data that is handled by the image processing device of the present disclosure is not limited to RAW image data, and for example, any image data, such as high-resolution rendering image data, may be employed. The image processing is not limited to the development processing, and any kind of image processing may be employed.

An aspect regarding a storage destination of image data is not limited to an aspect where image data is stored in the storage in the image processing device, and an aspect where image data is stored in an image server provided separately from the image processing device may be employed.

In the respective embodiments described above, the processing that is executed by the CPU 11 or 21 reading and executing software (an example of a program) may be executed by various processors other than a CPU. Examples of the processors in this case include a programmable logic device (PLD) that can change a circuit configuration after manufacturing, such as a field-programmable gate array (FPGA), and a dedicated electric circuit that is a processor having a circuit configuration dedicatedly designed for executing specific processing, such as an application specific integrated circuit (ASIC). The respective processing may be executed by one of various processors or may be executed by a combination of two or more processors (for example, a plurality of FPGAs or a combination of a CPU and an FPGA) of the same type or different types. The hardware structure of various processors is more specifically an electric circuit (circuitry), in which circuit elements, such as semiconductor elements, are combined.

In the respective embodiments described above, although an aspect where the image processing program is stored (for example, installed) in the ROM 12 or the storage 14 in advance has been described, the present disclosure is not limited thereto. The program may be provided in a form recorded in a recording medium, such as a compact disk read only memory (CD-ROM), a digital versatile disk read only memory (DVD-ROM), or a universal serial bus (USB) memory. Alternatively, the program may be in a form of being downloaded from an external device through a network.

In addition to the above, it is needless to say that alternations may be made without departing from the spirit and scope of the present disclosure. The technique of the present disclosure also extends to a recording medium that non-transitorily stores the program, in addition to the program.

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. An image processing device comprising:
   at least one processor configured to
   set a reference region of a plurality of the reference regions that is a partial region in an image indicated by image data;
   store, in association with the image data, information regarding the reference region including a position of the set reference region in the image and image processing parameters of the reference region;
   set a predetermined region in the image as a display region;
   generate image processing parameters of the display region based on the image processing parameters of the reference region and output a processed image obtained by executing image processing on the display region based on the generated image processing parameters of the display region, wherein the reference region and the display region are different;
   in response to have the processor having set the plurality of the reference regions, set priority of the reference region indicating the image processing parameters given priority among the image processing parameters of the plurality of the reference regions as the information regarding the reference region, and
   generate the image processing parameters of the display region based on the priority of the reference region and the image processing parameters of the reference region.

2. The image processing device according to claim 1, wherein the processor is configured to generate the image processing parameters of the display region based on a distance between the reference region and the display region and the image processing parameters of the reference region.

3. The image processing device according to claim 1, wherein the processor is configured to generate the image processing parameters of the display region based on an area of the reference region and the image processing parameters of the reference region.

4. The image processing device according to claim 1, wherein the image data is RAW image data, and the image processing executed by the processor includes development processing on the RAW image data.

5. An image processing method comprising:
   setting a reference region of a plurality of the reference regions that is a partial region in an image indicated by image data;
   storing, in association with the image data, information regarding the reference region including a position of the set reference region in the image and image processing parameters of the reference region;
   setting a predetermined region in the image as a display region;
   generating image processing parameters of the display region based on the image processing parameters of the reference region and outputting a processed image obtained by executing image processing on the display region based on the generated image processing parameters of the display region, wherein the reference region and the display region are different;
   in response to set the plurality of the reference regions, setting priority of the reference region indicating the image processing parameters given priority among the image processing parameters of the plurality of the reference regions as the information regarding the reference region, and
   generating the image processing parameters of the display region based on the priority of the reference region and the image processing parameters of the reference region.

6. A non-transitory storage medium storing a program that causes a computer to execute an image processing, the image processing comprising:
   setting a reference region of a plurality of the reference regions that is a partial region in an image indicated by image data;
   storing, in association with the image data, information regarding the reference region including a position of the set reference region in the image and image processing parameters of the reference region;
   setting a predetermined region in the image as a display region;
   generating image processing parameters of the display region based on the image processing parameters of the reference region and outputting a processed image obtained by executing image processing on the display region based on the generated image processing parameters of the display region, wherein the reference region and the display region are different;

in response to set the plurality of the reference regions, setting priority of the reference region indicating the image processing parameters given priority among the image processing parameters of the plurality of the reference regions as the information regarding the reference region, and generating the image processing parameters of the display region based on the priority of the reference region and the image processing parameters of the reference region.

\* \* \* \* \*